May 24, 1960  HANS-JOACHIM M. FÖRSTER  2,937,543
SPEED CHANGE TRANSMISSION
Filed July 10, 1956
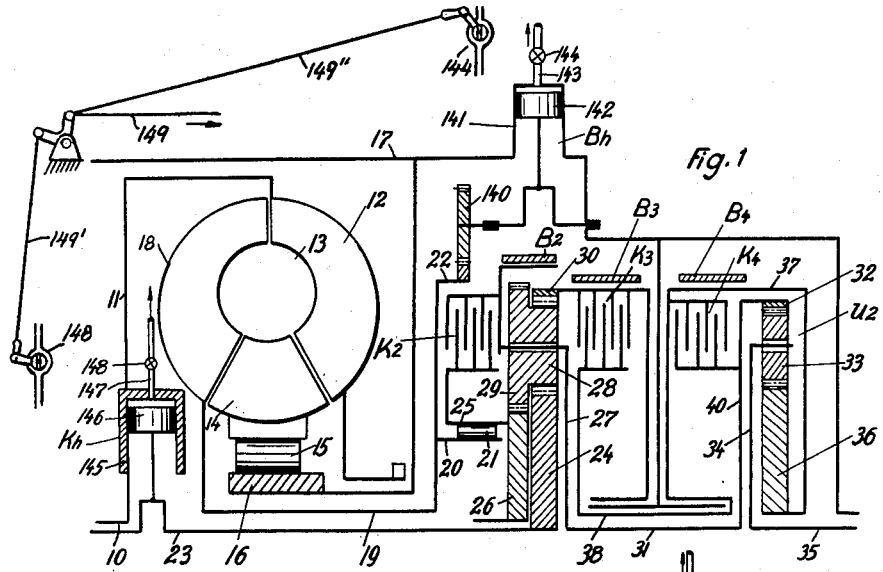
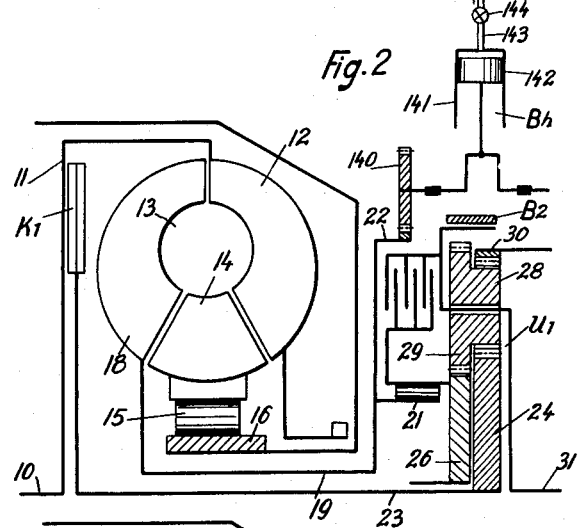
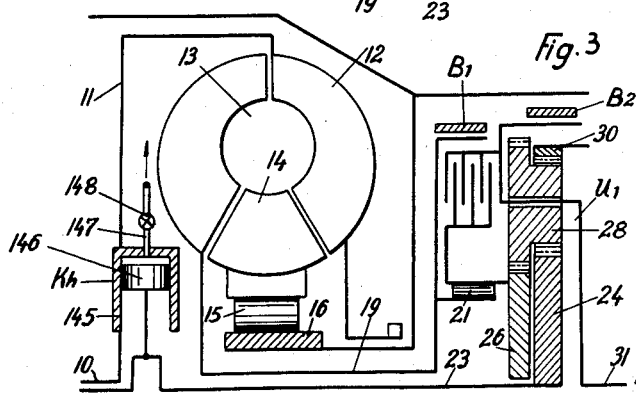
Inventor
HANS-JOACHIM M. FÖRSTER
BY Dicke and Craig
ATTORNEYS

United States Patent Office 2,937,543
Patented May 24, 1960

2,937,543

SPEED CHANGE TRANSMISSION

Hans-Joachim M. Förster, Stuttgart-Bad Cannstatt, Germany, assignor to Daimler-Benz Aktiengesellschaft, Stuttgart-Unterturkheim, Germany Filed July 10, 1956, Ser. No. 597,017

Claims priority, application Germany July 14, 1955

13 Claims. (Cl. 74—688)

The present invention relates to an improvement of the speed change transmisison disclosed and claimed in my earlier patent application Serial No. 560,647, filed January 23, 1956, now U.S. Patent No. 2,890,601, same being a speed change transmission in which the impeller of a hydrodynamic power transfer device, such as a torque converter, is connected to the driving shaft, whereas the turbine wheel of the hydrodynamic device may be selectively connected to the driven shaft at different ratios of transmission by any one of a plurality of trains of gears. Moreover, mechanical motion-transmitting means including a friction clutch connect the driving shaft to the afore-mentioned trains of gears and bypass the hydrodynamic device, such as the torque converter, when the friction clutch is engaged. A brake acts on the turbine wheel to thereby apply a hydraulically produced braking torque to the driven shaft through the friction clutch when the same is engaged and through the gearing. When the turbine wheel is brought to a full stop by the brake, the entire braking energy is dissipated and converted into heat within the hydrodynamic device (torque converter or clutch). As this energy may be quite considerable, excessive heat may be produced in the hydrodynamic device.

It is the object of the present invention to reduce the heat produced in the hydrodynamic device by the braking operation thereby relieving the hydrodynamic device thermally and to improve the control of the braking couple produced in this manner.

Further objects of the invention are to provide a hydrostatic brake for controlling the energy dissipated by the hydrodynamic device.

Further objects of the present invention will appear from the description following hereinafter of a number of preferred embodiments of the invention illustrated in the accompanying drawings. It is to be clearly understood, however, that the invention is in no way limited to the details of such embodiments, and that the terms and phrases used in such detailed description have been chosen for the purpose of illustrating the invention rather than that of restricting or limiting the same.

In the drawings,

Fig. 1 is a diagrammatic sectional view of a preferred form of the novel transmission, the upper half of the section only being shown as the lower half is symmetrical thereto and, therefore, need not be represented, Fig. 2 is a sectional view similar to that shown in Fig. 1 of a modification of the transmission, only so much of the transmission being shown as is affected by such modification, and Fig. 3 is a view similar to that of Fig. 2 of a third embodiment of the present invention.

The speed change transmission to which the present invention is applicable comprises a housing 17, a driving shaft 10, a hydrodynamic power transfer device 13 composed of an impeller 12 connected to the driving shaft 10, of a turbine wheel 18, and of means conducting a liquid for circulation through said impeller and said turbine wheel, such means including a guide vane rotor 14, said transmission further comprising a driven shaft 35, a gearing having a plurality of trains of gears selectively connecting the turbine wheel 18 to the driven shaft 35 at different ratios of transmission, and mechanical motion-transmitting means including a clutch K1 having one clutch member connected to the driving shaft 10 and the other clutch member connected to the gearing. These mechanical motion-transmitting means are adapted, when rendered active by engagement of the clutch K1, to bypass the hydrodynamic power transfer device in the transfer of power from the driving shaft 10 to the driven shaft 35. However, the mechanical motion-transmitting means may be rendered inactive by disengagement of the clutch K1 whereby the power will be transferred from shaft 10 to shaft 35 by the hydrodynamic action exerted upon the turbine wheel 18 by the liquid put in circulation by the impeller 12.

In the embodiment illustrated in Figure 2, the clutch K1 comprises a clutch disk 23a rotatable with and connected for axial movement on the transmission shaft 23 by means of a keyed connection 23b. The clutch disk is biased toward a wall of drum 11 to be referred to hereinafter by means of springs 11d acting through an axially slidable pressure disk 11a, thereby engaging the clutch K1. Hydraulic cylinders 11c may be filled with pressure fluid from the conduit 11e to move piston 11b against the force of springs 11d, thereby disengaging the clutch K1 relieving the pressure of disk 11a on the clutch disk 23a.

In the embodiment illustrated, a drum 11, which may act as a flywheel, is fixed to the driving shaft 10 which may be the shaft of an engine of a motor vehicle. The drum 11 is rigidly connected with the impeller 12. The rotor 14 carrying guide vanes is connected with a stationary supporting ring 16 by a one-way locking device formed by a plurality of clamping rollers 15 inserted in pockets formed by teeth of ring 16 and the smooth internal cylindrical surface of the rotor 14, the teeth having slanting sides engaging the clamping rollers 15 in a known manner. The clamping rollers 15 are operative to permit the rotor 14 to freely rotate in forward direction of rotation, but to lock the rotor against rotation in the opposite direction.

The turbine wheel 18 is rigidly connected by a hollow shaft 19 with an annular clutch member 20 of a freewheeling clutch 21 and with a brake drum 22 of a brake B1 which is diagrammatically illustrated in Fig. 3 as comprising a brake strap.

Preferably, each train of gears of the gearing which selectively connects the turbine wheel 18 to the driven shaft 35 at different ratios of transmisison is formed by an epicyclic transmission composed of at least three elements mounted for rotation about a common axis. The hollow shaft 19 surrounds a shaft 23 which connects one section of the bypass clutch K1 to the first element 24 of the first epicyclic transmission U1, the other section of the clutch K1 being rigidly connected to the drum 11. The first element 24 of the epicyclic transmission U1 constitutes the inner sun gear thereof. The transmission further comprises as the second element a second sun gear 26 mounted for free rotation on the shaft 23 and, as the third element of the transmission U1, a planetary gear carrier 27 fixed to a shaft 31 which is mounted coaxially to the shafts 10, 23 and 35. The planetary gear carrier 27 carries a plurality of planetary gears each having a set of gear teeth 28 meshing with sun gear 24 and a second set of gear teeth 29 being of larger pitch diameter than the gear teeth 28 and meshing with sun gear 26. Moreover, the transmisison U1 includes a fourth element formed by an internal gear 30 surrounding the sun gear 24 in spaced relationship thereto and being in permanent mesh with the gear teeth 28 of the planetary gears. A clutch member 25 which surrounds clutch member 20 and cooperates with free-wheeling clutch rollers 21 disposed therebetween is rigidly attached to the sun gear 26. The free-wheeling clutch 20, 21, 25 is so designed that it may transfer a driving torque from the turbine wheel 18 through the hollow shaft 19, the clutch member 20, the rollers 21 and the clutch member 25 secured to the sun gear 26 driving the latter in the direction of rotation of the driving shaft 10, but permits the sun gear 26, when the latter is driven by a couple transferred through the bypass clutch K1, to overtake the clutch member 20.

A locking clutch K2, which is preferably formed by a multi-disk clutch of customary design, is axially disposed between the epicyclic transmission U1 and the hydrodynamic power transfer device 12, 14, 18 and is radially disposed between the overrunning clutch 20, 25 and the brake B1. This locking clutch is adapted to clutch the elements 27 and 26 of the epicyclic transmission U1 to each other to thereby lock the transmission U1 for rotation of its elements 24, 26, 27, and 30 in unison. For this purpose, an inner set of disks of the clutch K2 is mounted for common rotation with the clutch member 25 and the sun gear 26 fixed thereto and is interleaved between the outer set of disks mounted for common rotation with the planetary gear carrier 27 and with a brake drum connected thereto forming part of a brake B2. The brake B2 when put in operation will arrest the planetary gear carrier 27 holding the same stationary with respect to the housing of the same. The fourth element 30 of the transmission U1 is rigidly connected with a brake drum forming part of a brake B3 and may be arrested by actuation of the latter.

The third element of the first epicyclic transmission, to wit the planetary gear carrier 27, is connected by an axially disposed shaft 31 and a suitable disk 40 with the second element 32 of the second epicyclic transmission U2, such second element in the embodiment shown being formed by an internal gear 32 meshing with a plurality of planetary gears 33 carried by a planetary gear carrier 34 which constitutes the first element of the transmission U2 and is fixed to the driven shaft 35. The third element of the transmission U2 is formed by a sun gear 36 meshing with the planetary gears 33. The shaft 35 may be geared to the wheels of a motor vehicle through the intermediary of a differential transmission.

The sun gear 36 is rigidly connected with one end wall of a cylindrical drum 37, the opposite end wall of which is secured to a hollow shaft 38 surrounding shaft 31. The shaft 38 is adapted to be clutched to the gear element 30 of the transmission U1 through the intermediary of a disengageable clutch K3 which is preferably formed by a conventional multi-disk clutch having two interleaved sets of disks, one set being fixed to the brake drum of the brake B3 and the other set being fixed to an annular member rigidly connected to the hollow shaft 38. The drum 37 constitutes a brake drum of a brake B4 and, therefore, may be held stationary relative to the transmission housing. Moreover, the second epicyclic transmission U2 is provided with a lock clutch K4 adapted to rigidly clutch the gear element 32 to the gear element 36. Preferably, the lock clutch K4 comprises two interleaved sets of disks, one set being fixed to an end wall of cylindrical drum 37 and the other set being fixed to disk 40.

Suitable electrical, hydraulic or pneumatic actuating means are associated with the clutches K1, K2, K3, K4 and with the brakes B2, B3 and B4 and are controlled by a ratio selector so as to be individually engaged or disengaged during the operation of the transmission. As such actuating means and such ratio selector are well known in the art, they have neither been shown nor described. Preferably, the ratio selector is of an automatic type being automatically set in dependence on the speed of the vehicle and the driving torque produced by the engine to any one of a plurality of positions, being adapted in said positions to determine different ratios of transmission by selective engagement and disengagement of the various clutches and brakes. More particularly, the ratio selector is settable to an "uphill" condition and a "normal" condition. In one of said conditions it is operative to select one group of ratios and in the other one of said conditions the selector is operative to select another group of ratios.

The second, third and fourth forward ratios and the reverse ratio under condition "normal" require the same control of the brakes and clutches as the third, fourth and fifth forward ratios and the reverse ratio respectively under the condition "uphill." The setting up of the transmission to these ratios requires engagement of the bypass clutch K1 so that power is transmitted by purely mechanical elements. In the reverse ratio the bypass clutch K1 is disengaged so that power is transmitted to shaft 35 in reverse direction through the hydrodynamic device 13 and the free-wheeling clutch 21.

When conditioned "normal," the transmission may be set up to an additional hydraulic ratio, to wit the first speed ratio, in which power is transmitted through the hydrodynamic device. When conditioned "uphill," the transmission may be set up to a mechanical second speed ratio provided in addition to the hydraulic first speed ratio which is a particularly high ratio of transmission. More particularly, the transmission, when set up as stated hereinafter, will transfer the power through the elements listed hereinafter:

Condition "uphill," first speed ratio.—10, 12, 18, 19, 21, 26 (30 arrested by brake), 29, 28, 27, 31, 32 (36 arrested by brake), 33, 34, 35 (only elements engaged: B3, B4).

Condition "uphill," second speed ratio.—10, K1, 23, 24 (30 arrested by brake), 28, 27, 31, 32 (36 arrested by brake), 33, 34, 35 (only elements engaged: K1, B3, B4).

Condition "normal," first speed ratio.—10, 12, 18, 19, 21, 26 (30 arrested by brake), 29, 28, 27, 31, U2 (locked by lock clutch K4), 35 (only elements engaged: K4, B3).

Condition "uphill," third speed ratio, and condition "normal," second speed ratio.—10, K1, 23 24 (30 arrested by brake), 28, 27, 31, U2 (locked by lock clutch K4), 35 (only elements engaged: K1, K4, B3).

Condition "uphill," fourth speed ratio, and condition "normal," third speed ratio.—10, K1, 23, U1 (locked by lock clutch K2), 27, 31, 32 (36 arrested by brake), 33, 34, 35 (only elements engaged: K1, K2, B4).

Condition "uphill," fifth speed ratio, and condition "normal," fourth speed ratio.—10, K1, 23, U1 (locked by lock clutch K2), 31, U2 (locked by lock clutch K4), 35 (only elements engaged: K1, K2, K4).

Condition "uphill," reverse speed ratio, and condition "normal," reverse speed ratio.—10, 12, 18, 19, 21, 26 (27 arrested by brake B2), 29, 28, 30, K3, 38, 37, 36 (32 arrested by brake B2), 33, 34, 35 (only elements engaged: K3, B2).

The transmission so far described has been disclosed in the above mentioned co-pending patent application.

For the purpose of the present invention a hydraulic brake $B_h$ is substituted for the brake B1 which in Fig. 3 is shown as a mechanical brake including a brake strap. Preferably, the hydraulic brake is a hydrostatic brake constituting a pump, an adjustable throttle valve being connected therewith to throttle the liquid fed by such pump.

In the embodiment illustrated in Fig. 2, the hydrostatic brake comprises a stationary cylinder 141 which may be mounted on the housing 17 of the transmission, a plunger 142 mounted in the cylinder 141 for reciprocation and connected by a connecting rod to a crank-shaft to which a gear 140 is secured. The gear 140 meshes with an annular gear fixed to the brake drum 22. The throttle valve connected with the pump is designated by 144. It is inserted in the pressure pipe 143 of the pump. Moreover, the pump includes the conventional intake and outlet valves which are omitted for sake of clarity. The brake $B_h$ is rendered ineffective by fully opening the throttle valve 144. When the driver wishes to apply the brake, he will close the throttle valve 144 more or less to thereby apply a braking couple to the brake drum 22 and to the turbine wheel 18 rigidly connected therewith.

Preferably, the clutch K1 is a clutch combined with means for controlling the relative movement of the clutch parts thereof. Whereas any suitable mechanical clutch such as a friction disk clutch in which the pressure at the friction disks may be varied to vary the slippage or relative movement between the clutch parts may be used for this purpose, a hydrostatic clutch $K_h$ has been found to be particularly satisfactory. In the embodiments of the present invention illustrated in Figs. 1 and 3 the hydrostatic clutch constitutes a pump, such as a piston pump, comprising one or a plurality of cylinders 145 mounted on the drum 11 for common rotation therewith, a plunger 146 being mounted in each cylinder 145 for reciprocation and being connected with a connecting rod to a crank or eccentric secured to the shaft 23. An adjustable throttle valve 148 is inserted in the pressure pipe 147 of the cylinder or cylinders. Moreover, the cylinder 145 is equipped with the conventional intake and outlet valves which for sake of simplicity are not illustrated. In this manner, the relative movement between the clutch parts of the clutch $K_h$ can be controlled very accurately by suitable adjustment of the throttle valve 148. Whereas in the embodiment illustrated in Fig. 2 a hydraulic brake $B_h$ is shown as being combined with a mechanical friction clutch K1, the embodiment illustrated in Fig. 3 includes a mechanical brake B1 and a hydrostatic clutch $K_h$. In the embodiment shown in Fig. 1 both a hydraulic brake $B_h$ and a hydrostatic clutch $K_h$ are provided.

Whereas both the brake $B_h$ and the clutch $K_h$ are illustrated as comprising piston pumps, any other suitable type of hydrostatic pump may be used.

When the transmission has been set up to first speed ratio or to the reverse speed ratio either in the condition "uphill" or in the condition "normal," the driving couple is transferred from the driving shaft via the hydrodynamic device 13, the free-wheeling clutch 21 and the epicyclic gears to the driven shaft. When the transmission is set up to any of the other ratios, however, the driving couple is transferred from the driving shaft 10 via the slip clutch K1, or $K_h$ with valve 148 being closed to gear 24 and thence through the epicyclic gears to the driven shaft.

When the driver desires to brake the vehicle, he will throttle the flow of liquid through the valves 144 and 148 of the embodiment according to Figure 1 by moving the valves 144 and 148 to produce the desired throttling action in any conventional manner, such as, for example, by a conventional linkage system 149, 149′ and 149″. The valves 144 and 148 may thereby be closed simultaneously or independently of one another. All that is necessary to produce the braking torque is that both be actuated simultaneously.

With the transmission constructed as shown in Figure 2, in order to produce the braking torque it is only necessary to actuate the friction clutch K1 and to throttle the valve 144 of the hydrostatic brake $B_h$. This again may be done either simultaneously or independently of one another in any suitable conventional manner.

With the transmission constructed as shown in Fig. 3 he will apply the mechanical brake B1 and will throttle the flow through valve 148 at the same time in any conventional manner analogous to that illustrated in Fig. 1.

The braking couple may be gradually increased by slowly increasing the throttle effect. A considerable part of the energy to be dissipated will be converted into heat in the throttle valves and will be imparted to the flow of liquid through the pipes 43 and 147. In this manner, the heat may be transported outwardly without difficulties and may be used for any desired purpose, for instance for heating purposes.

Since the braking couple acts on both the hydraulic brake $B_h$ and the hydrodynamic device 13 in the embodiments illustrated in Figs. 1 and 2, and since in the embodiment shown in Fig. 3 the braking couple acts on both the hydrodynamic device 13 and the hydrostatic clutch $K_h$, a portion only of the braking energy will be dissipated in the hydrodynamic device 13. This is a considerable advantage of the present invention, the balance of the energy being dissipated either in the throttle valve 144 or in the throttle valve 148 or in both. Whereas in the embodiment illustrated in Fig. 2 the hydraulic brake $B_h$ will dissipate the major portion of the braking energy, it is characteristic of the embodiment illustrated in Fig. 3 that where the braking energy is high, nearly all of it will be dissipated in the torque converter or other hydrodynamic device 13 which in this event acts with full slippage. This is of advantage because the torque converter is better suited for dissipating energy than a hydrostatic device, such as a pump, because the dissipation of energy is effected in the torque converter by turbulence and impact only. Also if the throttle valve 148 of the hydrostatic clutch $K_h$ is only partially closed, a small fraction only of the braking energy not exceeding twenty to twenty-five percent, as a rule, is dissipated therein. The maximum couple to be transferred by the clutch $K_h$ will not exceed the engine torque. This has a favorable effect on the design.

Any suitable throttling means adapted to throttle the flow of liquid through the pipes 143 and 147 may be substituted for the valves 144 and 148.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A change-speed transmission comprising a driving shaft, a hydrodynamic power transfer device comprising an impeller connected to said driving shaft, a turbine wheel and means conducting a liquid circulating through said impeller and said turbine wheel, a driven shaft, gear means including a plurality of trains of gears selectively connecting said turbine wheel to said driven shaft at different ratios of transmission, clutch means enabling variable relative movement between the clutch parts thereof and connecting said driving shaft to said gear means and adapted, when active, to bypass said hydrodynamic power transfer device, means for controlling said variable relative movement of the clutch parts of said clutch means, a disengageable clutch interposed in the connection between said turbine wheel and said gear means, and means including a brake connected with and operative to act on said turbine wheel to apply a hydraulically produced braking torque to said driven shaft through said clutch means and through said gear means to said driven shaft upon simultaneous activation of both said clutch means and said brake.

2. A change-speed transmission comprising a driving shaft, a hydrodynamic power transfer device comprising an impeller connected to said driving shaft, a turbine wheel and means conducting a liquid circulating through said impeller and said turbine wheel, a driven shaft, gear means including a plurality of trains of gears selectively connecting said turbine wheel to said driven shaft at different ratios of transmission, mechanical motion-transmitting means connected to said driving shaft and to said gear means and adapted, when active, to bypass said hydrodynamic power transfer device and to be rendered inactive, a disengageable clutch interposed in the connection between said turbine wheel and said gearing, and means including a hydraulic brake connected with and operative to act on said turbine wheel to apply a hydraulically produced braking torque to said driven shaft through said mechanical motion-transmitting means and through said gear means to said driven shaft upon simultaneous activation of said mechanical motion transmitting means and of said hydraulic brake.

3. A change-speed transmission comprising a driving shaft, a hydrodynamic power transfer device comprising an impeller connected to said driving shaft, a turbine wheel and means conducting a liquid circulating through said impeller and said turbine wheel, a driven shaft, a gear means including a plurality of trains of gears selectively connecting said turbine wheel to said driven shaft at different ratios of transmission, a clutch means enabling variable relative movement between the clutch parts thereof and connecting said driving shaft to said gearing and adapted, when active, to bypass said hydrodynamic power transfer device and to be rendered inactive, means for controlling said variable relative movement between the clutch parts of said clutch means, a disengageable clutch interposed in the connection between said turbine wheel and said gear means, and means including a hydraulic brake connected with and operative to act on said turbine wheel to apply a hydraulically produced braking torque to said driven shaft through said clutch means and through said gear means to said driven shaft upon simultaneous activation of said clutch means and of said hydraulic brake.

4. A change-speed transmission as claimed in claim 1 in which said clutch means is a hydrostatic clutch constituting a pump, and wherein said means for controlling said relative movement between the clutch parts of said clutch means is constituted by adjustable throttling means connected with said pump to throttle the liquid fed thereby.

5. A change-speed transmission as claimed in claim 3 in which said clutch means is a hydrostatic clutch constituting a pump, and wherein said means for controlling said relative movement between the clutch parts of said clutch means is constituted by adjustable throttling means connected with said pump to throttle the liquid fed thereby.

6. A change-speed transmission as claimed in claim 1 in which said brake is a hydrostatic brake constituting a pump, said change speed transmission further comprising an adjustable throttle valve connected with said pump to throttle the liquid fed thereby.

7. A change speed transmission comprising a driving shaft, a hydrodynamic power transfer unit having an impeller connected to said driving shaft and a turbine wheel, a driven shaft, gear means including a plurality of trains of gears to selectively connect said turbine wheel to said driven shaft at different ratios of transmission, a deactivatable clutch device connecting said driving shaft to said gearing and adapted, when active, to bypass said hydrodynamic power transfer unit, disengageable clutch means interposed in the connection between said turbine wheel and said gearing, a brake device connected with and operative to act on said turbine wheel, and means for simultaneously activating said clutch device and said brake device so as to apply a braking torque by said brake device to said driven shaft through said clutch device and through said gearing to said driven shaft.

8. A change speed transmission according to claim 7 in which at least one of said two devices is a hydrostatic device.

9. A change speed transmission according to claim 7 wherein said clutch device includes means for controlling the relative rotational speeds of the two clutch halves with respect to each other.

10. A change speed transmission according to claim 7 wherein said brake device is a hydrostatic brake and said disengageable clutch device is a mechanical clutch.

11. A transmission according to claim 7 wherein said brake device is a hydrostatic brake.

12. A transmission according to claim 7 wherein both said brake device and said clutch device are hydrostatic devices.

13. A change speed transmission according to claim 7 wherein said disengageable clutch means includes one-way clutch means.

References Cited in the file of this patent
UNITED STATES PATENTS

| | | |
|---|---|---|
| 2,374,866 | King | May 1, 1945 |
| 2,442,840 | Carnagua | June 8, 1948 |
| 2,738,689 | Dodge | Mar. 20, 1956 |
| 2,771,967 | Larson | Nov. 27, 1956 |

UNITED STATES PATENT OFFICE
Certificate of Correction

Patent No. 2,937,543                                                    May 24, 1960

Hans-Joachim M. Förster

It is hereby certified that error appears in the above numbered patent requiring correction and that the said Letters Patent should read as corrected below.

In the drawings, the present "Fig. 2" should appear as shown below instead of as in the patent:

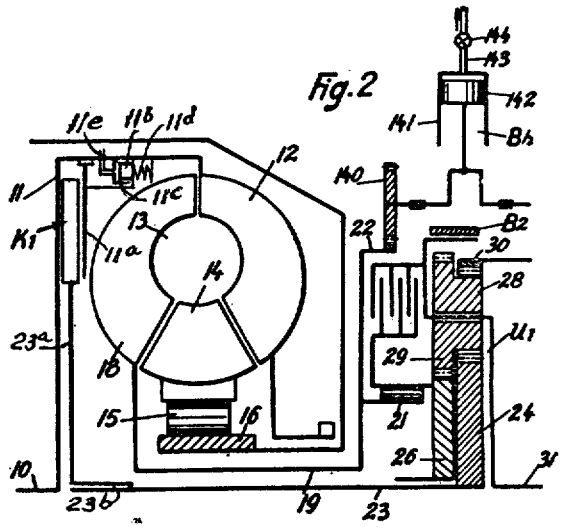

Signed and sealed this 3rd day of October 1961.

[SEAL]

Attest:
ERNEST W. SWIDER,
*Attesting Officer.*

DAVID L. LADD,
*Commissioner of Patents.*